(12) United States Patent
Campbell

(10) Patent No.: US 9,111,461 B2
(45) Date of Patent: Aug. 18, 2015

(54) METHOD FOR DENTAL EDUCATION

(75) Inventor: Melissa Leeann Campbell, West Chester, OH (US)

(73) Assignee: The Iams Company, McLean, VA (US)

( * ) Notice: Subject to any disclaimer, the term of this patent is extended or adjusted under 35 U.S.C. 154(b) by 336 days.

(21) Appl. No.: 13/437,060

(22) Filed: Apr. 2, 2012

(65) Prior Publication Data

US 2013/0260349 A1    Oct. 3, 2013

(51) Int. Cl.
*G09B 19/00* (2006.01)

(52) U.S. Cl.
CPC .................................. *G09B 19/0084* (2013.01)

(58) Field of Classification Search
CPC .................................................. G09B 19/0084
See application file for complete search history.

(56) References Cited

U.S. PATENT DOCUMENTS

| | | | |
|---|---|---|---|
| 5,296,217 | A | 3/1994 | Stookey |
| 6,080,419 | A | 6/2000 | Stookey |
| 6,509,007 | B2 | 1/2003 | Rajaiah et al. |
| 2003/0082277 | A1 | 5/2003 | Sokhey et al. |
| 2005/0139167 | A1 | 6/2005 | Leo |
| 2006/0275344 | A1 | 12/2006 | Mody et al. |
| 2007/0140990 | A1 | 6/2007 | Fetissova et al. |
| 2011/0257399 | A1* | 10/2011 | Minta et al. .................. 544/375 |

FOREIGN PATENT DOCUMENTS

| | | |
|---|---|---|
| EP | 0644722 B1 | 9/2000 |
| WO | WO 03/009710 A1 | 2/2003 |

OTHER PUBLICATIONS

PCT International Search Report for PCT/US2013/034903, dated Jul. 24, 2013—4 pages.
Morr et al., "How Much Calcium is in Your Drinking Water? A Survey of Calcium Concentrations in Bottled and Tap Water and Their Significance for Medical Treatment and Drug Administration", HSS J. Sep. 2006, vol. 2, No. 2, pp. 130-135—Abstract.
Bazerque, et al., "Secretion of Calcium by the Salivary Glands in the Dog", Journal of Dental Research, 1967, vol. 16, p. 446.
"Fluorescent Ca2 + Indicators Excited with Visible Light", Life Technologies, Section 19.3-28 pages, Feb. 20, 2012.
Langley et al., "Secretion of Calcium and Phosphate by the Dog Parotid Gland", Department of Physiology, University of Alabama Medical Center, Apr. 26, 1961.

\* cited by examiner

*Primary Examiner* — Sam P Siefke
(74) *Attorney, Agent, or Firm* — Tracey S. Truitt; Polsinelli PC

(57) ABSTRACT

A kit for demonstrating or explaining the action of a mineral ion scavenger in an oral care composition. A method for demonstrating or explaining the action of a mineral ion scavenger in an oral care composition. A kit and/or method for providing perceptible confirmation of the action and/or effectiveness of an oral care composition comprising a mineral ion scavenger.

9 Claims, No Drawings

METHOD FOR DENTAL EDUCATION

FIELD OF THE INVENTION

This disclosure relates generally to a kit and/or a method for providing educational information about dental hygiene. In some aspects, this disclosure relates to a kit and/or a method for demonstrating or explaining the action of an oral care product.

BACKGROUND OF THE INVENTION

Advances in the understanding of calculus formation have enabled new technologies for preventing the formation of build-up, including tartar or plaque, on the teeth. Preventing such build-ups may reduce the need for procedures to remove the build-up, procedures which may be costly, time-consuming, painful, or anxiety-inducing. The build-up should be prevented or removed, because otherwise the build-up can, over time, contribute to a decline in oral health, including pain, swelling, loose or lost teeth, bad breath, and the like.

Products which function to prevent dental build-up may rely upon fairly sophisticated chemistry. Explaining the technology may seem to require explaining principles in inorganic (mineral) chemistry, biochemistry, anatomy, nutrition, and the like, which may exceed the typical scientific education and/or interest of at least some people who would otherwise be interested in selling, buying, or using these products. However, some of the products are so effective that the touted benefits may be perceived as incredible without some understanding of the underlying technology.

There remains a need for tools to explain or demonstrate the action and/or effectiveness of oral care products. There remains a need for tools that provide perceptible confirmation of the action and/or effectiveness of dental care products.

SUMMARY OF THE INVENTION

In some aspects, this disclosure describes a kit for evaluating or demonstrating mineral ion scavenging activity. The kit may comprise a standard solution. The standard solution may comprise a known concentration of a mineral ion. The mineral ion may be associated with dental plaque formation. The kit may comprise a mineral ion indicator. The mineral ion indicator may be capable of distinguishing mineral ions which are and are not in a state suitable for participating in plaque formation.

In some aspects, this disclosure describes a method of demonstrating the method of action or efficacy of a mineral ion scavenger-containing oral care composition. The method may comprise providing a standard solution. The standard solution may comprise a known concentration of a mineral ion. The mineral ion may be associated with dental plaque formation. The method may comprise adding to the standard solution a mineral ion indicator. The mineral ion indicator may be capable of distinguishing mineral ions which are and are not in a state suitable for participating in plaque formation. The method may comprise contacting the standard solution with an oral care composition. The oral care composition may comprise a mineral ion scavenger.

DETAILED DESCRIPTION OF THE INVENTION

As used herein, "oral care composition" refers to any product or composition which is intended to prevent, reduce, eliminate, or treat a decline in oral health. A decline in oral health may describe functional deficits, including pain, swelling, loose or lost teeth, or bad breath associated with undesirable microbial flora. A decline in oral health may describe cosmetic deficits, such as stains or build-up on the teeth. An oral care composition may be a dentrifice or may be another kind of product designed to provide oral health benefits. For example, a pet food composition may include components designed or intended to provide oral health benefits.

As used herein, "pet food composition" refers to a product intended for ingestion by a domestic companion animal, such as a dog or a cat. A pet food composition may be a supplement or treat, or may be a complete and nutritionally balanced diet.

As used herein, "complete and nutritionally balanced" refers to a composition that provides all of a typical animal's nutritional needs when fed according to feeding guidelines for that composition, or according to common usage, if no feeding guidelines are provided. Such nutritional needs are described, for example, in Nutrient Profiles for dogs and cats published by the Association of American Feed Control Officials.

As used herein, "a," "an," and "the," refer to one or more elements, unless expressly stated otherwise (e.g., "a single . . . ").

The tooth is composed of three layers: the inner pulp (where blood flows), the dentin and the outer enamel. Connecting all three layers is a network of tubules. The enamel and dentin layers are composed of calcium and phosphate, but the chemical ratio is slightly different allowing the enamel to be harder. Due to the minerals, the tooth surface can have positively and negatively charged areas.

Calculus formation involves a cycle of biological and physical events. The first step is a biofilm formation. Saliva transports minerals, proteins, and bacteria. Glycoproteins adhere to the enamel in a thin layer and contribute to stain. The layer thickens within hours as bacteria adhere and multiply. This early stage plaque accumulation begins along the gingival margin and builds with random bacteria, food particles, and sloughed epithelial cells. Generally, the outer layer hosts aerobic, gram-positive bacteria, while the interior layer hosts anaerobic bacteria. The anaerobic bacteria can colonize under the gingival margin, and produce toxins that can lead to tissue damage, tooth loss, and bacteria entering the bloodstream.

The second step involves the precipitation of salivary minerals. Within 60 hours, mineralization begins to occur within the biofilm matrix in the interstitial locations between bacteria, and spreads to occupy the spaces within dead bacterial cell walls. Organic muccopolysaccharides formed by plaque microorganisms are layered within the biofilm and serve as an initial point of growth. The process is fueled by calcium and phosphate salts in the saliva. Once formed, the porous surface of calculus encourages more plaque and mineral deposits.

This process of "building-up" plaque and/or mineral deposits can be inhibited by mineral ion scavengers, which may bind to the minerals in saliva and interfere with the incorporation of those minerals into plaque or plaque precursors. Thus, mineral ion scavengers may slow or prevent the initial development of plaque, or slow the progressive build-up of existing plaque. Mineral ion scavengers may include, for example, phosphates, including pyrophosphates, polyphosphates, polyphosphonates; synthetic anionic polymers, such as polyacrylates or copolymers of maleic anhydride or methyl vinyl ether; polyamino propane sulfonic acid; zinc citrate trihydrate; polypeptides, such as polyaspartic acid or polyglutamic acid; and combinations thereof. One exemplary sub-class of mineral ion scavengers that may be useful in an oral care composition is calcium phosphate surface active builders (CPSABs). CPSABs share in common an affinity for tooth minerals, such as calcium phosphate found in enamel or dentin, and a negative charge.

One exemplary CPSAB is Sodium Hexametaphosphate (HMP). Like other CPASBs, HMP has a strong binding affinity for tooth minerals, such as calcium phosphate found in enamel or dentin. The calcium activity of HMP is due to the chemical structure of repeating pyrophosphate subunits, which gives it a stronger attraction to calcium hydroxyapatite. As a long chain molecule, HMP has more binding sites giving it a greater chance of adsorption and retention on the tooth surface or with any positively charged calcium based site.

With regards to calculus inhibition, HMP works in two ways. First, in the saliva, HMP is solubilized and becomes another salivary mineral. In this environment, it seeks out positively charged species such as ionic calcium. When the calcium adsorbate comes into contact with the surface of the HMP, it forms a chemical bond. The particle is trapped onto the HMP surface as it does not possess enough energy to break the chemical bond. Once trapped, the calcium is not free to bind within the plaque matrix and cannot form new tartar.

Secondarily, the HMP binds to the positively charged sections of the tooth, the plaque matrix, or any prior calculus deposit. When binding to the tooth, HMP can dislodge chromogens within the pellicle than can contribute to stain. Once bound, HMP neutralizes the charged binding sites that attract other calcium ions that contribute to calculus. Ultimately, all HMP-Ca complexes are either broken down by either enzymatic or environmental conditions with minerals released and absorbed by the body.

A mineral ion scavenger can be introduced into the mouth through any number of carriers or products. For example, a mineral ion scavenger could be incorporated into a dentrifice, such as a toothpaste (including brushing aids in the form of a gel or cream as well as pastes); a candy, lozenge, or gum, such as those described, for example, in US2006/0275344 to Mody, et al.; a chewable toy or object, such as those described, for example, in US 2005/0139167 to Leo; denture adhesives; a food product, such as those described, for example in U.S. Pat. No. 6,080,419 to Stookey; beverages; or oral care compositions other than toothpaste, such as those described, for example, in U.S. Pat. No. 6,509,007 to Rajaiah, et al. The mineral ion scavenger may be incorporated into a pet food, which may be complete and nutritionally balanced. The pet food may be in the form of dry kibble, having a moisture level less than 15% by weight of the product, or semi-moist kibble, having a moisture level less than 50% by weight of the product, or may comprise a combination of dry kibble and semi-moist kibble.

However, explaining how these products or carriers might effectively reduce or prevent the formation of tartar, plaque, or related films on the teeth can be complicated. The mechanism of action is not perceptible to the product user, i.e., you can't "see" the product work, and in some products, repeated use may be necessary to see noticeable changes in the teeth. Indeed, if the change induced by the product is a reduced rate of plaque build-up, it may be difficult to detect except over extended periods of time. Consumers may be reluctant to re-purchase a product if benefits are not readily apparent after a first purchased supply is exhausted. For example, if a chewing gum claims to reduce plaque build-up, and no visible improvement is noticed after 1 week of chewing the gum, the gum might not be repurchased even though it was effective.

Explaining the mechanism of action may require more space than is available on the package. It is easy to envision this for small products, like dental floss or chewing gum, but even on relatively large packages, such as 40 or 50 pound bags of dog food, a lengthy explanation of the mechanism of action of an oral care additive might be neglected among information more immediately important to a consumer, such as the type of food or suggested feeding guidelines. Even if space is readily available to include an explanation, a long and highly technical explanation might not capture the attention or interest of consumers, or might be unconvincing to consumers who do not have an interest in or educational background related to biology, chemistry, or dentistry.

It may be desirable to provide a visual demonstration of the activity of an oral care ingredient, such as a mineral ion scavenger. The visual demonstration may be provided in person; in a group (as in an auditorium or at an open-air fair); via television (including live and recorded video, whether broadcast or provided on tape, CD, DVD, or electronically, such as delivery over the internet); in static pictures, such as may be presented in a series in a brochure, book, booklet, handout, flyer, or electronically; or in images or icons, such as illustrations, drawings or other images derived from a live performance of the demonstration or pictures of the demonstration. In some embodiments, the demonstration is an "actual demonstration," meaning the demonstration is performed live or is presented without modification, i.e., that any images of the demonstration, whether in video or still formats, are captured during the demonstration and are not modified, as by simplifying the images to produce line drawings.

In some embodiments, a kit for dental education may comprise a standard solution comprising a mineral ion associated with plaque formation. The standard solution may be provided pre-mixed or may be provided in two or more parts. If the standard solution is provided in two or more parts, the kit may include instructions for preparing a standard solution from the two or more parts. For example, if the standard solution is a solution of calcium, the kit may comprise separately packaged distilled water and calcium powder or solution which can be mixed, per instructions, to reach the desired molarity of calcium. Calcium may be a desirable mineral ion for the kit because it is required by many animals for good health (i.e., would be expected to be present in the mouth regularly following meals or supplementation), is commonly present in animal saliva, and is also a significant component of most dental plaques. It may be desirable to provide the components for the standard solution in the kit, e.g., to provide distilled water rather than relying on the use of tap or bottled water. This may help make the demonstration more accurate and/or more predictable, since the content of calcium, for example, can vary significantly based on the source of the water. In some embodiments, the concentration of the mineral ion in the solution may approximate an amount of the mineral ion in the saliva of an animal at a specific time. For example, the concentration of the mineral ion may be adapted to reflect typical or average concentrations of the mineral ion in the saliva of an animal before, during, or after a meal. Such concentrations may vary by species or other demographic information and can be determined by one of ordinary skill in the art. As an example, if the mineral ion comprises calcium, the concentration of the mineral ion may be between 0.0375 milliMole (mM) and 3.0 mM. This range would correspond to ranges reported in the literature for calcium ion concentration in dog saliva. The standard solution may visually resemble distilled water. That is, the standard solution may look like water in that it is not cloudy or colored, at least not to any noticeable degree. The standard solution may comprise two or more different mineral ions associated with plaque formation, "different mineral ions" referring to distinct chemical species which are not reversible variants of one another in equilibrium.

In some embodiments, the standard solution may be saliva. The saliva may be from a selected species, such as a human, dog (canine) or cat (feline). The saliva may be provided in the kit, or the kit may contain instructions for collecting a saliva sample for use as the standard solution. In some embodiments, the standard solution comprises simulated saliva. Simulated saliva may be formulated to mimic two or more physical or chemical characteristics of saliva, such as pH, enzyme content, viscosity, total solute concentration, or combinations thereof. Simulated saliva may be provided premixed, or may be provided in two or more parts. If the simulated saliva is provided in two or more parts, the kit may include instructions for preparing a standard solution from the two or more parts. Although actual saliva provides a more realistic test environment, simulated saliva may be preferred if the actual saliva may be disease-carrying or otherwise pose a biohazard. Alternatively, actual saliva may be treated to reduce the risk of handling it, as by sterilizing the saliva. Sterilization may be performed using any suitable method, such as heat, pressure, or combinations thereof. It may be possible to chemically sterilize the saliva, however, if chemical sterilization is used, care should be taken to ensure that the chemical process does not modify the mineral ion content or state of the mineral ions in the saliva sample.

The kit may comprise a mineral ion indicator. The mineral ion indicator may be solid, liquid, gaseous, or mixed phase, however, the use of solid and/or liquid mineral ion indicator may simplify preparation and use of the mineral ion indicator. The mineral ion indicator may be packaged separately, for addition to the standard solution by the final user, or the mineral ion indicator may be included in the standard solution as provided. The mineral ion indicator may be colorimetric, changing color with changes in the mineral ion concentration. The mineral ion indicator may fluoresce in the presence of the mineral ion. For example, visible-light-excitable $Ca^{2+}$ indicators are known in the literature and may be useful as mineral ion indicators in a kit for dental education. As another example, engineered proteins or protein complexes are available which fluoresce in the presence of specific mineral ions. For example, an engineered protein may comprise green fluorescent protein fused with calmodulin (which binds calcium ions) and the M13 domain of the myosin light chain kinase, which binds calmodulin. Regardless of the type of indicator used, colorimetric and/or fluorescent mineral ion indicators share the property of changing spectral properties on interaction with the mineral ion above a threshold concentration. The threshold concentration may vary with the mineral ion indicator used, among other conditions, and the standard solution concentration of the mineral ion, or other test conditions, such as pH or temperature, may be adjusted accordingly. The mineral ion indicator may provide other visual indications of the presence of the mineral ion, such as the precipitation of solids, or visible effects of a chemical reaction, such as bubbling, phase separation, solidification, or liquefaction.

In some embodiments, the mineral ion indicator may provide alternative feedback indicating the presence or absence of a mineral ion, such as heat transfer or pH change. If the mineral ion indicator is not a visual indicator, the kit may comprise additional components to help demonstrate the indicator results, such as a thermometer, pH test, visual pH indicator, or the like, depending upon the nature of the mineral ion indicator. The mineral ion indicator may be added to the standard solution to provide an indication of the presence or absence of a mineral ion in the standard solution. It is not necessary that mineral ion indicator change the appearance of the standard solution. In some embodiments, however, it may be preferred that the mineral ion indicator change the appearance of the standard solution to affirmatively signal the presence of the mineral ion. For example, the mineral ion indicator, upon addition to the standard solution, may change the color or turbidity of the solution, such that the presence of the mineral ion in the standard solution is signaled. In one embodiment, the standard solution looks like distilled water before adding the mineral ion indicator, and has a distinct color, such as pink, after adding the mineral ion indicator. If the mineral ion indicator provokes a change in the standard solution, such as precipitating the mineral ion out of solution, it may be desirable to add the mineral ion indicator after adding the oral care composition, as described below. Typically, the mineral ion indicator is selected so that it will indicate the presence of free or unbound mineral ion (above some minimum concentration), but will not indicate the presence of bound, chelated, complexed, or otherwise modified mineral ion that would not participate in plaque formation.

The kit may comprise an oral care composition. The oral care composition may comprise a mineral ion scavenger. The amount or form of the oral care composition may vary from a normal sale unit. For example, the amount of the oral care composition may be limited to a single dose, or even a fraction of a single dose proportionate to the volume of standard solution provided. In some embodiments, the amount of the oral care composition may be greater than a standard sale unit. For example, if the kit will be used to provide a demonstration to a large audience, as in an auditorium, the standard solution volume may be quite large, and the volume or amount of the oral care composition may be adjusted upward proportionately. In some embodiments, the amount of the oral care composition is proportionate to a single dose, or a single sip (as of a beverage), or a single bite (as of a food, snack, or treat). In some embodiments, the amount of the oral care composition is proportional to the amount of the standard solution. In some embodiments, the amount of the oral care composition is proportional to the amount of the standard solution, and the concentration of mineral ion in the standard solution is comparable to an average, biologically relevant amount, such as the average concentration of the mineral ion in the saliva of a human or other species, such as a dog or a cat. The oral care composition may be in any form, and may comprise any mineral ion scavenger, as described above with reference to non-limiting examples. In some embodiments, the kit does not comprise an oral care composition. In some embodiments, the kit may be used to test for mineral ion scavenging activity in a product of the kit user's choosing and/or supply.

The kit may comprise a test composition. The kit may be used to compare the mineral ion scavenging activity of the oral care composition, if present, to the test composition. The amount or form of the test composition may vary from a "normal" sale unit. For example, the amount of the test composition may be limited to a single dose, or even a fraction of a single dose proportionate to the volume of standard solution provided. In some embodiments, the amount of the test composition may be greater than a standard sale unit. For example, if the kit will be used to provide a demonstration to a group of people, as in an auditorium, classroom, meeting room, or other group setting, the standard solution volume may be quite large, and the volume or amount of the test composition may be adjusted upward proportionately. In some embodiments, the amount of the test composition is proportionate to a single dose, or a single sip (as of a beverage), or a single bite (as of a food, snack, or treat). In some embodiments, the amount of the test composition is proportional to the amount of the standard solution. In some embodiments, the amount of the test composition is proportional to the amount of the standard solution, and the concentration of mineral ion in the standard solution is comparable to an average, biologically relevant amount, such as the average concentration of the mineral ion in the saliva of a human or other species, such as a dog or a cat. The test composition may be in any form. In some embodiments, the test composition is as described above with reference to non-limiting examples, except that the test composition does not contain a mineral ion scavenger. In some embodiments, the test composition is in the same form as the oral care composition (i.e., the test composition and oral care composition are the same general types of compositions, such as both compositions being toothpastes, or both being food products). In some embodiments, the test composition is provided and/or tested in the same amount as the oral care composition. In some embodiments, the test composition is provided and/or tested in the same form and dose or amount as the oral care composition. In some embodiments, the kit does not comprise a test composition. In some embodiments, the kit comprises two or more different test compositions.

The kit may comprise a container for evaluating or demonstrating a dental or oral care benefit or activity in a product. The container may help to provide context for the evaluation or demonstration. For example, the container may be shaped like a mouth or teeth. Alternate containers include vials, beakers, cups and the like, which may be made of glass or synthetic polymers, such as polyethylene terephthalate, or any material chemically and physically compatible with the other kit components (e.g., non-water soluble, if the kit comprises distilled water or a standard solution comprising distilled water). The containers may be selected for a lack of chemical reactivity with the mineral ion, the mineral ion indicator, and/or the mineral ion scavenger. The containers may be selected for a lack of chemical reactivity with the oral care composition and/or test composition, if those compositions are included or specified in the kit. The container may advantageously be transparent or translucent, particularly, but not exclusively, in embodiments wherein the mineral ion indicator is a visual indicator. Of course, the demonstration may be feasible in an opaque container if the visual indication can be viewed from an opening in the container.

The kit may be provided to dentists, dental hygienists, veterinarians, or other health providers or health educators, for demonstrating the method of action and/or efficacy of oral care compositions comprising a mineral ion scavenger. The kit may be provided to sales representatives, customer care representatives, marketers, or others, for demonstrating the method of action and/or efficacy of oral care compositions comprising a mineral ion scavenger. The kit may be provided to consumers or patients, for evaluating the mineral ion scavenging capacity of one or more products. For example, a kit may be provided to a consumer or patient so that the consumer or patient may test his or her oral care product of choice for this method of action or benefit. The kit may be configured to test one product, or two products, or multiple products. The kit may include the products to be tested, such as an oral care composition and a test composition, or may include instructions or guidance for selecting suitable products for testing (e.g., instructions to look for products labeled as containing ingredients known or believed to be mineral ion scavengers). Of course, the kit may also be used to produce live or pre-recorded demonstrations of the method of action and/or efficacy of an oral care product, and those demonstrations may be shared via any suitable event or method with a desired audience.

A method for demonstrating a dental benefit or providing dental education may comprise providing a standard solution of a mineral ion associated with plaque formation. The method may comprise preparing a standard solution of a mineral ion associated with plaque formation, as by mixing a known quantity of distilled water with a known amount of mineral ion (in solution or solid form) to produce a standard solution containing a known concentration of the mineral ion. The standard solution may be as described above. The method may comprise adding a mineral ion indicator to the standard solution. The mineral ion indicator may be added to the standard solution before, after, or simultaneously with adding the oral care composition or test composition, as described below. The mineral ion indicator may be as described above. The mineral ion indicator may be included in the standard solution as provided, in which case the method might not comprise adding a mineral ion indicator to the standard solution.

The method may comprise contacting the standard solution with an oral care composition comprising a mineral ion scavenger, a test composition, or both. The standard solution may be contacted with the oral care or test composition by placing the oral care or test composition in a container containing the standard solution, or otherwise floating or submerging the oral care or test composition in standard solution. Alternately, the standard solution may be contacted with the oral care or test composition by pouring the standard solution over the oral care or test composition. In some embodiments, the standard solution is contacted with the oral care or test composition indirectly, as by swabbing or dabbing the standard solution onto the oral care or test composition with a swab or pad, such as a cotton swab or gauze pad. Alternately, the oral care or test composition may be swabbed or dabbed and contacted with the standard solution. The swab or pad contacted first with the oral care or test composition may be floated or submerged in the standard solution. If a direct or indirect sample of the oral care or test composition is floated or submerged in the standard solution, the standard solution may be shaken, stirred, vibrated, inverted, or otherwise mixed to insure adequate opportunity for interaction between the oral care or test composition and the standard solution.

Example 1

A kit included all of the following components, and instructions for mixing the components as follows. Distilled water (10 mLs) is stirred with calcium added to make a 1 millimolar (mM) solution of calcium. Taylor Calcium Indicator R-0012 (commercially available from Taylor Technologies, Inc. of Sparks, Md., USA, is added in an amount sufficient to turn the solution a pinkish-purplish color, at approximately 10 mLs, this was 6 drops. Each of the foregoing steps was done twice, once each in two separate vials. To each vial was added 2 kibbles (2 pieces, as removed from a commercially available bag with no division or other modification) of dry dog food. To one vial, a dog food comprising a mineral ion scavenger was added. To the other vial, a dog food not comprising a mineral ion scavenger was added. Each vial is capped and shaken by hand for 5-10 seconds. Within 15 seconds, the solution in the vial containing the dog food comprising a mineral ion scavenger turned a distinctly different color, blue, indicating a reduction in unbound calcium. The solution in the vial containing the dog food not comprising a mineral ion scavenger did not change color, indicating that the presence of unbound calcium did not change in that vial. From the color change, it was possible to see an effect from adding an oral care ingredient to a dog food.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of demonstrating the method of action or efficacy of a mineral ion scavenger-containing oral care composition, the method comprising:

providing a standard solution comprising a known concentration of a mineral ion associated with plaque and/or mineral deposit formation;

adding to the standard solution a mineral ion indicator capable of distinguishing mineral ions which are and are not in a state suitable for participating in plaque formation; and contacting the standard solution with an oral care composition comprising a mineral ion scavenger.

2. The method of claim 1, wherein the mineral ion indicator is added to the standard solution prior to contacting the standard solution with the oral care composition.

3. The method of claim 2, wherein the mineral ion indicator is a visual indicator.

4. The method of claim 1, further comprising contacting the standard solution with a test composition that does not contain a mineral ion scavenger.

5. The method of claim 4, wherein the oral care composition and the test composition are of the same form.

6. The method of claim 5, wherein the oral care composition and the test composition are contacted with the standard solution in the same dose or amount.

7. The method of claim 1, wherein the oral care composition is floated or submerged in the standard solution.

8. The method of claim 7, further comprising shaking, stirring, vibrating, inverting, or mixing the standard solution with the oral care composition.

9. The method of claim 1, wherein the mineral ion comprises calcium and the oral care composition is a pet food.

* * * * *